US010169847B1

(12) United States Patent
Heineck et al.

(10) Patent No.: US 10,169,847 B1
(45) Date of Patent: Jan. 1, 2019

(54) AIR-TO-AIR BACKGROUND ORIENTED SCHLIEREN TECHNIQUE

(71) Applicant: The United States of America as Represented by the Administrator of the National Aeronautics and Space Administration, Washington, DC (US)

(72) Inventors: James Thomas Heineck, San Jose, CA (US); Daniel William Banks, Carmichael, CA (US); Edward Treanor Schairer, Palo Alto, CA (US); Paul Stewart Bean, Lancaster, CA (US); Edward Andrew Haering, Jr., Lancaster, CA (US); Brett Arnold Pauer, Tehachapi, CA (US); Brittany Joan Martin, Edwards, CA (US); David Nils Larson, Lancaster, CA (US)

(73) Assignee: The United States of America as Represented by the Administrator of NASA, Washington, DC (US)

( * ) Notice: Subject to any disclaimer, the term of this patent is extended or adjusted under 35 U.S.C. 154(b) by 147 days.

(21) Appl. No.: 15/229,555

(22) Filed: Aug. 5, 2016

Related U.S. Application Data

(60) Provisional application No. 62/202,015, filed on Aug. 6, 2015.

(51) Int. Cl.
*G06T 5/00* (2006.01)
*B64D 47/08* (2006.01)
(Continued)

(52) U.S. Cl.
CPC ............. *G06T 5/002* (2013.01); *B64D 47/08* (2013.01); *G06K 9/6202* (2013.01); *G06T 5/50* (2013.01);
(Continued)

(58) Field of Classification Search
CPC . G06T 5/002; G06T 5/50; G06T 2207/10032; G06T 2207/20224; B64D 47/08; H04N 7/183
(Continued)

(56) References Cited

U.S. PATENT DOCUMENTS 3,693,015 A * 9/1972 Funk, Jr. ............... B64F 1/00
250/564
5,534,995 A * 7/1996 Weinstein ............ G01N 21/455
356/129

(Continued)

OTHER PUBLICATIONS

Richard, H. et al. "Background oriented schlieren demonstrations", Final Report No. 8963-AN-015 (European Research Office, Edison House, Old Marylebone Road, London NW15TH, United Kingdom) May 2001, pp. 1-37.
(Continued)

*Primary Examiner* — Marnie Matt
(74) *Attorney, Agent, or Firm* — Christopher J. Menke; Robert M. Padilla; Mark P. Dvorscak

(57) ABSTRACT

An air-to-air background-oriented Schlieren system and method for measuring and rendering visible density changes in air that cause a refractive index change by an airborne vehicle. A sensor aircraft equipped with a high-speed visible spectrum camera travels at low airspeed on a predetermined route and on a level altitude over a background having consistent contrast and sunlight reflectivity. The target aircraft, traveling on the same predetermined route but at an altitude between the sensor aircraft and the ground (background) passes beneath the sensor aircraft. The camera on the sensor aircraft captures a series of images including a reference image immediately before the target aircraft enters the image frame followed by several data images as the target aircraft passes through the image frame. The data images are processed to calculate density gradients around
(Continued)

the target aircraft. These density gradients include shockwaves, vortices, engine exhaust, and wakes. Air density gradients cause a refractive index change in the fluid and a slight distortion in the background pattern of the data image. Image processing that compares the data image to the reference image yields the difference caused by the density gradient.

10 Claims, 9 Drawing Sheets

(51) Int. Cl.
    *G06T 5/50*     (2006.01)
    *H04N 7/18*     (2006.01)
    *G06K 9/62*     (2006.01)
    *G06T 7/00*     (2017.01)

(52) U.S. Cl.
    CPC ........... *G06T 7/0026* (2013.01); *H04N 7/183* (2013.01); *G06T 2207/10032* (2013.01); *G06T 2207/20224* (2013.01)

(58) Field of Classification Search
    USPC ........................................................ 348/147
    See application file for complete search history.

(56) References Cited

U.S. PATENT DOCUMENTS

| | | | |
|---|---|---|---|
| 9,599,497 B1* | 3/2017 | Haering, Jr. | G01F 1/7086 |
| 2006/0262324 A1* | 11/2006 | Hays | G01N 21/47 356/519 |
| 2014/0267781 A1* | 9/2014 | Buckner | G01N 21/455 348/187 |
| 2014/0340502 A1* | 11/2014 | Freeman | G06T 7/20 348/79 |
| 2017/0082124 A1* | 3/2017 | Kremeyer | B61C 7/00 |
| 2017/0315564 A1* | 11/2017 | Thomas | G05D 1/104 |

OTHER PUBLICATIONS

Banks, D., "Fundamental Aeronautics Program! Supersonics Project", Technical Presentation; National Aeronautics and Space Administration; Dryden Flight Research Center, Mar. 2011 Technical Conference, Cleveland, OH, pp. 1-18.

Raffel, Markus, "Background-oriented schlieren (BOS) techniques", Exp Fluids (2015) 56:60, pp. 1-17.

Hargather, M.J. et al, "Natural-background-oriented schlieren imaging", Exp Fluids, Jul. 2009, pp. 1-10.

* cited by examiner

AIR-TO-AIR BACKGROUND ORIENTED SCHLIEREN TECHNIQUE

PRIORITY CLAIM

This application claims priority to Provisional Patent Application No. 62/202,015, Airborne Background Oriented Schlieren Technique, filed on Aug. 6, 2015, the contents of which are incorporated herein in its entirety.

ORIGIN OF INVENTION

The invention described herein was made in the performance of work under a NASA contract and by an employee of the United States Government and is subject to the provisions of Section 20135(b) of the National Aeronautics and Space Act (51 U.S.C 20135(b)), as amended, Public Law 85-568 (72 Stat. 435, 42 U.S.C. § 2457), and may be manufactured and used by or for the Government for government purposes without payment of any royalties thereon or therefore.

TECHNICAL FIELD

The present invention relates to an air-to-air Background Oriented Schlieren Technique for visualizing supersonic flow phenomena with full-scale aircraft in flight.

BACKGROUND OF THE INVENTION

The determination of the location and strength of shockwaves and vortices is fundamental to understanding the flow around an aircraft. These features are strong enough to affect the environment that the vehicle inhabits. For example, they can cause drag and/or produce undesirable noise. The researcher must be able to predict and mitigate the effects of these flow features.

The best method for discovering new physics and/or validating computational models is by making measurements on a full-scale aircraft in flight. Importantly, a technique that can visualize and measure the strength of flow features would be highly advantageous to researchers.

An early method for airborne Schlieren makes use of the sun's edge as viewed through a telescope. The aircraft was observed and recorded through a telescope on the ground pointed at the sun as the aircraft passed through the field of view. The aircraft's shockwaves would distort the edge of the sun. High speed imaging of the fly-by was processed to extract the distorted edge and create a streak image of the airplane and its shockwaves. This method has the advantage of having the imaging system on the ground, thus reducing the cost by eliminating the observer aircraft.

The imagery of the shockwaves from this earlier method was unfortunately limited by the narrow field of view defined by the sun. Further, ground-based systems, using the sun as a light source, have produced good results but because of the distance involved did not have the desired spatial resolution to resolve small-scale shock structures near the aircraft. Also, the solution from this method does not currently have a theory or method by which the density gradient can be derived and thereby measured.

Accordingly, in light of the shortcomings of the previous solutions, there clearly exists a need for a modern version of the airborne Schlieren method to capture images of shockwaves created by supersonic airplanes that includes increased field of view and resolution enabling more precise calculations.

SUMMARY OF THE INVENTION

The basis of this manifestation of the Background Oriented Schlieren (BOS) method uses a slow moving sensor airplane outfitted with at least one viewport-mounted camera, a target airplane (airborne vehicle) passing between the camera, and a natural background such as desert floor populated with desert flora as the speckle for the background. The sensor airplane is used to capture images of the subject airborne vehicle where those images are processed in such a way as to reveal the density gradients (i.e. shockwaves, vortices, jet plumes) and measure the amount of distortion they cause in the background. This basic technique is hereafter referred to as the Airborne Background Oriented Schlieren method.

The present invention also utilizes BOS for yielding measured deflection distances, which can be used to determine the strength of a given density gradient. The deflection distance is the apparent shift of the speckles in the reference background image caused by the refractive index gradient caused by the density gradient.

One embodiment of the present invention includes an observer aircraft that flies at a high altitude and at a relatively low speed. The camera system located on the observer aircraft is focused on the terrain. The target aircraft is accelerated to its desired air speed and is navigated to fly below the observer aircraft at a prescribed altitude and through the field of view of the cameras. The cameras record the passage of the target aircraft.

Another embodiment of the invention includes the use of one (or more) high speed digital cameras whose spectral sensitivity can span 300 nm to 900 nm. Using additional matched and synchronized cameras improves the quality of the data.

Another aspect of the invention is to process the images taken by the observer aircraft to extract the density gradient information. A reference background image is chosen from the recorded sequence. Any image in the sequence prior to the entrance of the target aircraft in the field of view can be used as the reference background image.

A further aspect of the invention includes: (1) registering the data image to the reference image to minimize the displacement between the reference and data image due to movement of the observer aircraft, (2) defining of an interrogation grid that defines the measurement points, (3) tracking the movement of the target aircraft; and (4) measuring the displacement of the background between the reference and data images at each node of the interrogation grid by image cross correlation and/or optical flow algorithms. The calculated x and y deflections are collected and saved in a data array for further analysis. A contour plot of the deflection quantities yields a Schlieren image.

An additional aspect of the invention is for the Airborne method that processes the entire image sequence of the fly-by in order to yield a large number of instantaneous samples of the flow structure. If the flight conditions of the target aircraft are constant, the large number of instantaneous samples can be averaged to yield a smooth, clear rendering of the density gradients in the Schlieren image and provide low noise data for calculating the density gradients. This requires tracking the aircraft and offsetting the data at each image to account for its displacement.

The BOS method also advantageously allows researchers to see the shockwave geometry in the real atmosphere as the target aircraft flies through temperature and humidity gradients that cannot be duplicated in wind tunnels. The photographs and/or images produced by the BOS method will advantageously help researchers to validate computer simulations and wind tunnel test data used in designing future supersonic aircraft.

Accordingly, for a better understanding of the invention, its functional advantages and the specific objects attained by its uses, reference should be made to the accompanying drawings, claims and descriptive matter in which there are illustrated preferred embodiments of the invention.

DETAILED DESCRIPTION OF THE INVENTION

Figure 1:
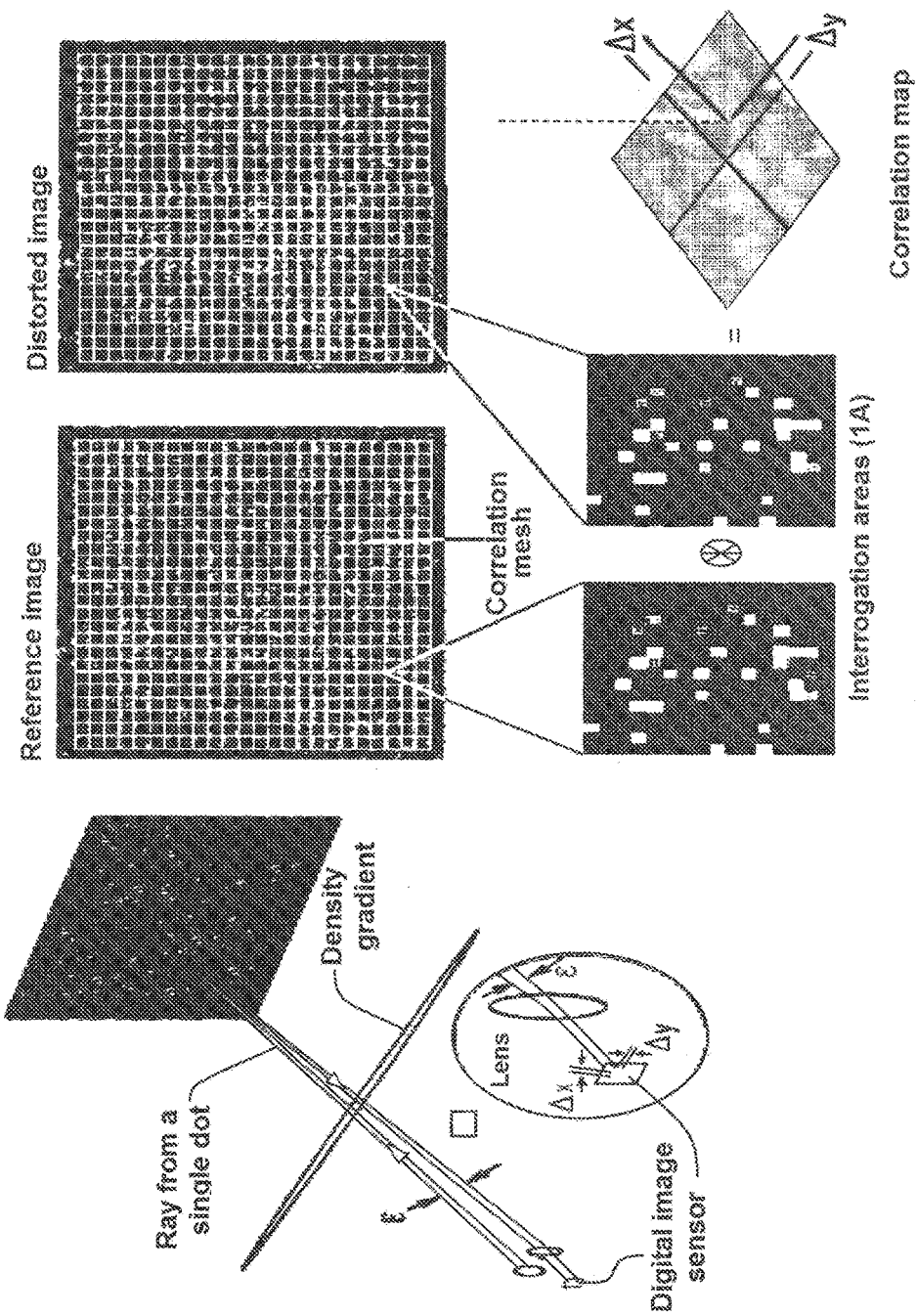
FIG. 1 shows the workflow and principle of Schlieren photography.

The following detailed description is of the best currently contemplated modes of carrying out various embodiments of the invention. The description is not to be taken in a limiting sense, but is made for the purpose of illustrating the general principles of the invention, since the scope of the invention is best defined by the appended claims.

A series of flight tests were undertaken to validate the effectiveness of an air-to-air background oriented Schlieren technique (AirBOS). The results of the flight-testing are believed to be the first AirBOS images obtained on a full-scale supersonic airplane in flight. The flights were conducted in the low-altitude supersonic test range near Edwards Air Force Base, California.

One embodiment of the invention utilized a slow-moving sensing airplane outfitted with a nadir view port-mounted camera, an airplane passing beneath the camera, and a desert floor populated with desert flora as the speckle background. The system design and flight planning were based on camera characteristics, aircraft coordination, and airspace limitations. Image processing required additional steps as compared with more conventional BOS applications, due to it being more complex than an equivalent static model wind-tunnel application.

Significant shock structure and apparent expansion fan was observed on the target airplane. The technique was relatively simple compared to other air-to-air flight-testing Schlieren systems that were in development. The flight-testing validated the AirBOS concept and provided high spatial resolution images of supersonic aircraft shock structure.

Nomenclature

AirBOS air-to-air background oriented Schlieren
A/C aircraft
AGL above ground level
ASIS airborne Schlieren imaging system
AVIRIS Airborne Visible/Infrared Imaging Spectrometer
Alt altitude
BOS background oriented Schlieren
CFD computational fluid dynamics
DLR German Aerospace Center (Deutsches Zentrum fir Lufi-und Raumfahrt e.V.)
Dn, dn, $\Delta$n change in an arbitrary direction
Dx, dx, $\Delta$x change in the x direction
Dy, dy, $\Delta$y change in the y direction
FOV field of view
g acceleration units
IR infrared
LCD liquid crystal display
M Mach number
MSL mean sea level
NASA National Aeronautics and Space Administration
NIR near infrared
$N_z$ normal acceleration
PDT Pacific Daylight Time
PIV particle image velocimetry
RBOS retro-reflective background oriented Schlieren
SNR signal to noise ratio
x longitudinal distance
y lateral distance
c angle of deflection Principles of BOS Obtaining Schlieren and shadowgraph images requires a digital imaging camera, either still or video, and a suitable background that lends itself to image cross-correlation. The principle of BOS works by detecting minute shifts of a speckle pattern caused by the presence of a density gradient that is large enough to create a refractive index change in the air. A quiescent image of the background serves as a reference to the image of the background distorted by the density gradient. These distortions are often smaller than a pixel; rarely can they be seen with the naked eye. The image cross-correlation techniques, however, as well as some optical-flow image-processing techniques, reveal these minute displacements of the speckle pattern.

FIG. 1 shows the workflow and principle of BOS. As shown in FIG. 1, the ray from the background (a speckle) passes through a density gradient and is deflected. The angle of deflection, e, is proportional to the strength and optical thickness of the gradient. The apparent shift in the location of a speckle pattern is detected with image cross correlation. The centroid of the correlation peak defines the shift, Dx and Dy. As with all measurement techniques that use image cross correlation, that is, PIV and surface deformation measurements (sometimes known as digital image correlation), the higher the resolution of the camera, the more detail can be gleaned.

In one embodiment of the invention, a sensor with small pixel size (4 to 10 microns) will be more sensitive to detecting weaker gradients than sensors with 20- to 25-micron pixels. Cross-correlation detection algorithms comfortably detect displacement of less than one-tenth of one pixel. It follows that the smaller the pixel, the smaller the speckle displacement that can be detected. The data that result from the cross-correlation are an array of points with displacements in x and y. These data can be plotted as a contour of Dx, which is analogous to conventional Schlieren with a vertical knife edge. Plotting Dy is the same as having a horizontal knife edge. A vector quantity of the two components permits a rotation of the "virtual knife edge," which provides calculated displacements in any arbitrary direction, Dn.

Methodology and Approach

The planning of the testing campaign was based on the requirements of the BOS technique. Magnification was chosen so that the background pattern (plants) was rendered by 2 to 5 pixels. The flight configuration consisted of a slow-moving observing airplane flying at a set altitude, with the supersonic test airplane flying at a lower altitude directly below the observer. The camera in the observing airplane is mounted in a nadir view port, added prior to this experiment.

Figure 2:
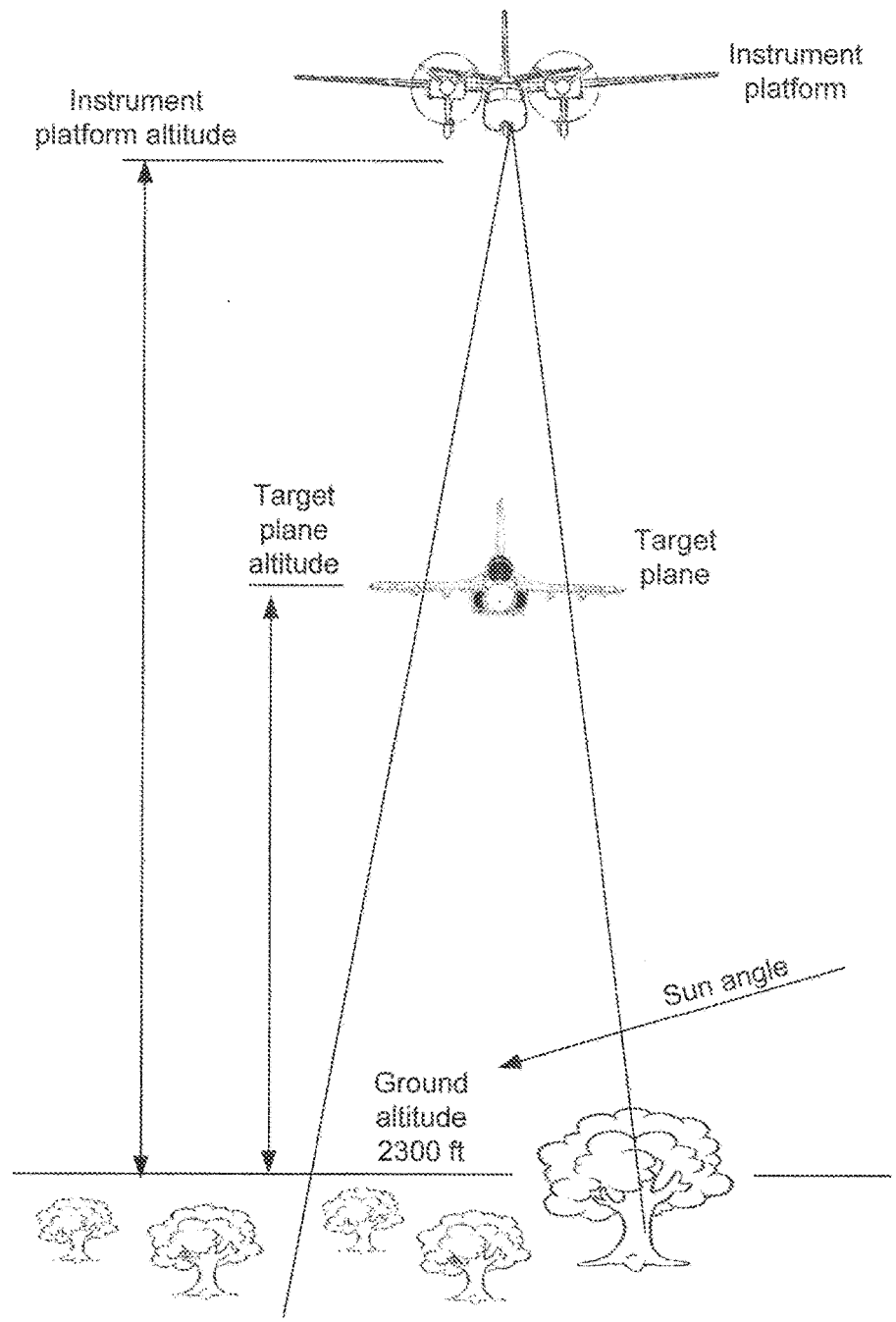
FIG. 2 shows a graphical depiction of the BOS methodology.
Figure 3:
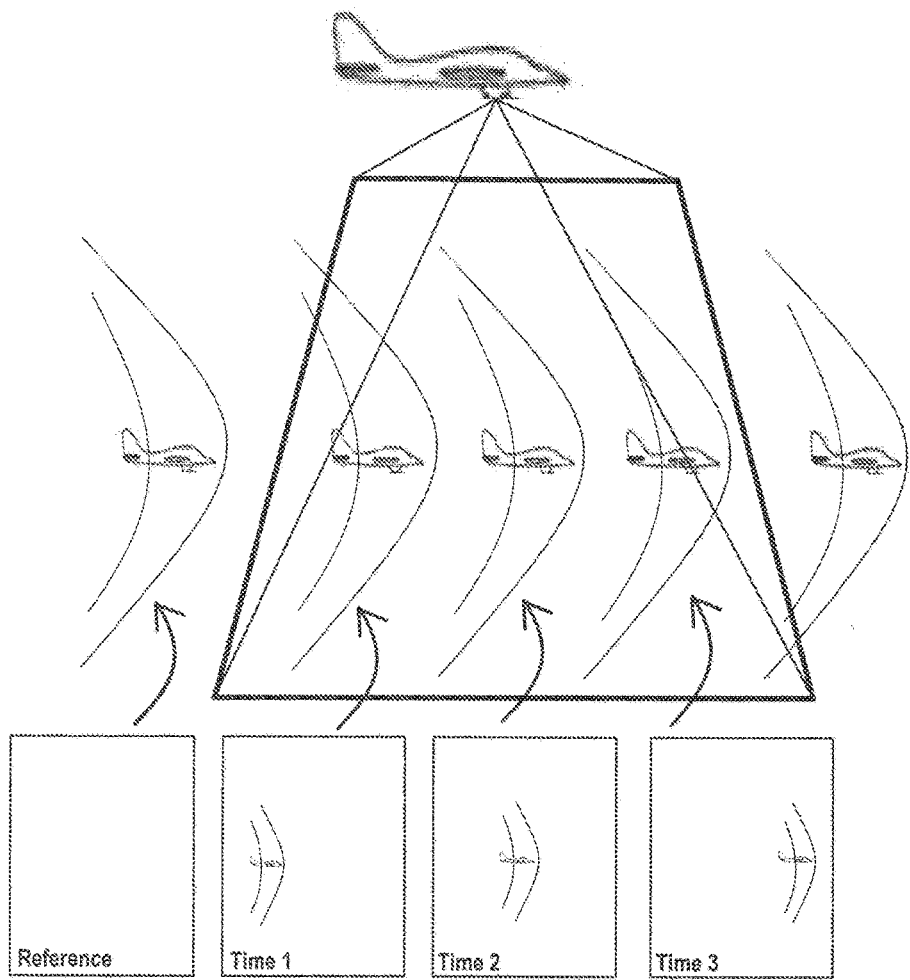
FIG. 3 shows a diagram of the AirBOS imaging scheme.

Based on wind tunnel and laboratory studies, the BOS method is most sensitive when the density gradient is located at approximately one-third to one-half of the distance from the camera to the background. The Airborne method does not follow this rule. The distance ratio is limited only to the hyperfocal distance of the observing lens, i.e., the aircraft should be at such a distance so as to remain in focus even as the critical plane of focus is the ground. For example, the observer at an altitude of 30,000 feet fitted with a 300 mm lens with a 650-foot hyperfocal distance can easily accommodate a target aircraft at 1000 foot below the observer, thus making the ratio 29/30ths, or approximately 97%. Altitude, sensor, and speckle dimensions defined, a lens was chosen that rendered the background at the desired spatial frequency (2 to 5 pixels per bush). Otherwise, the distance between the observer and the target can vary according to the requirements of the experiment. This is another advantage of the AirBOS method In another embodiment, the reference images were acquired by the observer airplane prior to the test airplane entering the camera field of view, thus continuous recording at the maximum frame rate was necessary as the test airplane approached. FIG. 2 presents a graphical depiction of this methodology; FIG. 3 shows the AirBOS imaging scheme.

Aircraft Configuration

In a further embodiment, a Beechcraft B-200 Super King Air (Beechcraft Corporation, Wichita, Kans., now Textron Inc., Providence, R.I.) (henceforth referred to as the King Air) was chosen for the sensor platform or also known as the observer plane. The King Air was equipped with two nadir (downward-facing) camera ports. The AirBOS test employed the forward nadir port for the tests described herein. Further discussion of the nadir ports can be found in the "Flight Operations" section below.

Apparatus

This section includes a description of the camera, optics, framegrabber, and computer processor used for data acquisition and storage. The environmental qualification of the flight-testing equipment is also discussed.
Camera and Optics:

In one embodiment, the camera chosen was a Goodrich SUI Visible to Short-wave IR (Goodrich/SUI SU640-SD-WHVis-1.7RT, FIG. 8), which has a Visible Indium Gallium Arsenide (InGaAs) sensor with spectral range of 0.4 µm to 1.7 µm, a resolution of 640 by 512 pixels, and a 25-micrometer pixel pitch. This camera has a maximum frame rate of 109 fps (at 640 by 512 pixels). This camera was chosen for its robustness to withstand the flight environment (high vibration, low pressures, and cold temperatures in an uncon-ditioned location) and to possibly take advantage of the near infrared (NIR) spectral band to increase the contrast of the plants against the background.

The acquired data were primarily in the visible spectra due to the optics used. In this embodiment, a 105-mm lens was chosen, giving an angular field of view of 8.7 by 6.8 deg. The magnification from that lens was also closest to maintaining the desired 2 to 5 pixels per bush. Image blur calculations help define the exposure time, which then affected the minimum lens aperture.

The relatively large pixel size, small focal plane array, and low frame rate, as compared to other possible units, would be a minimum standard for producing quality images. The intent of this test series was to validate the technique. Enhancements to the apparatus by using more capable cameras are within the scope of this invention. The optics was a single Nikon Nikkor 105 mm lens (Nikon Corporation, Tokyo, Japan), which has a spectral range from approximately 0.35 to 0.90 µm. Therefore, the system spectral range was approximately 0.40 to 0.90 µm. The camera outputs both analog (RS170) and digital (CameraLink) formats. The analog signal was sent to a monitor (Boland v068 6.8-inch LCD monitor) (Boland Communications, Inc., Lake Forest, Calif.) in the airplane cabin and the digital data were sent to the data acquisition system.
Data Acquisition:

In one embodiment, the data acquisition system consisted of a standard framegrabber card connected to a standard computer processor (portable computer). In another embodiment, the laptop computer was a Panasonic CF-30 Tough-Book® (Panasonic Corporation, Newark, N.J.). The Tough-Book® is a ruggedized laptop that has been used on other flight tests. The Toughbook® was further ruggedized for flight by replacing the hard drive with a solid-state drive. The framegrabber was an Epix PIXCI ECB 1 card (EPIX, Incorporated, Buffalo Grove, Ill.).

In a further embodiment, Epix XCAP software (version 3.0) was used to control the framegrabber acquisition and subsequent storage on the laptop. The camera digital data were output in CameraLink format. The hardware was located in the King Air cabin and operated by a flight test engineer. The data acquisition was manually triggered when the target airplane was approximately two miles away (in trail) during the acceleration. This method resulted in at least two seconds of data with system and operator lags prior to acquiring the target airplane in the image field, allowing the recording of some reference frames prior to target acquisition.

Flight Operations

This section discusses the flight profiles used. A list of the pre-selected altitude combinations, in above ground level (AGL), and the respective field of view (FOV) are shown in table 1. These altitudes would roughly conform to the desired constraints explained previously including the one-third and two-thirds distance criteria and the 2-5 pixels per bush (speckle) criteria.

TABLE 1

Field of view predicted with 105-mm lens based upon pre-selected altitudes.

| King Air altitude, AGL | F-18 altitude, AGL | FOV, ft by ft (m by m) |
|---|---|---|
| 9,000 ft (2743 m) | 6,000 ft (1829 m) | 456 by 366 (139 by 112) |
| 10,000 ft (3048 m) | 6,700 ft (2042 m) | 500 by 400 (152 by 122) |

TABLE 1-continued

Field of view predicted with 105-mm lens based upon pre-selected altitudes.

| King Air altitude, AGL | F-18 altitude, AGL | FOV, ft by ft (m by m) |
|---|---|---|
| 11,000 ft (3353 m) | 7,370 ft (2246 m) | 552 by 442 (168 by 135) |
| 12,000 ft (3658 m) | 8,040 ft (2451 m) | 604 by 482 (184 by 147) |

As previously described, the King Air was equipped with two nadir camera ports. The AirBOS tests utilized the forward port for this test campaign. The forward port appeared to be quieter in terms of flow disturbances, which was desirable for reducing potential camera motion. Both ports incorporated a door that could open in flight, reducing the possibility of foreign object damage to the camera or the lens during takeoff, landing, and ground operations.

Figure 4:
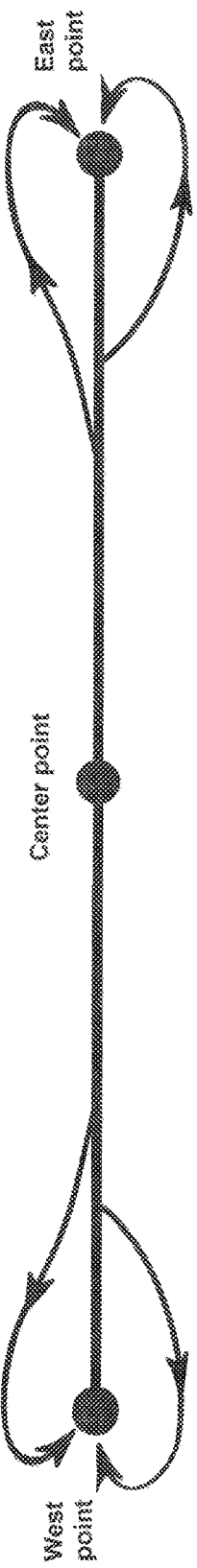
FIG. 4 shows the AirBOS course line and re-entry pattern.

The basic setup during the flight was to fly on a single pre-determined course line as shown in FIG. 4. The flights were planned to alternate from east and west, aligning them with the low-altitude supersonic corridor. All of the supersonic passes had to remain within the supersonic corridor. At the end of each pass, the King Air departed the line to the north, and the F-18 to the south. Each airplane then performed a "teardrop re-entry" and re-acquired the course line in the opposite direction. The two aircraft maintained vertical separation during the maneuver. The F-18, due to its higher speed, flew a wider and farther re-entry pattern.

The flights consisted of the F-18 executing a supersonic pass (at a Mach number of approximately 1.1) below the King Air. The F-18 remained relatively straight and level during each pass. The King Air maintained the slowest possible stable and safe operating airspeed during these operations (approximately 140 knots).

Determining the optimal aircraft altitudes is a balance between aircraft performance, ground vegetation detail, the apparent size of the F-18, and the largest possible viewing area for the target airplane to pass through. It was speculated that some ground vegetation shadowing would be preferable to increase contrast of the vegetation against the desert floor.

For obtaining some shadowing, the optimal planned flight times were not to take place mid-day during times of the year when the sun passes near the zenith. The sun elevation angle for this test varied between approximately 33 deg and 69 deg. The actual flight and pass information is given in table 2. The ground elevation under the flight path varied from approximately 3,000 ft to 3.500 ft.

TABLE 2

Flight and pass information.

| Flight no. | Date, 2011 | Time, local PDT | Total passes/ in view | King Air alt, ft MSL | F-18 alt, ft MSL | Comments |
|---|---|---|---|---|---|---|
| 1 | 6 April | 10:00-10:37 | 5/4 | 12,200-15,200 | 9,200-11,300 | Some clouds (darker) |
| 2 | 7 April | 9:15-9:50 | 6/4 | 12,200-15,200 | 9,200-11,300 | Altitude optimization |
| 3 | 21 April | 10:47-11:27 | 6/4 | 23,000 | 15,300 | High altitude |
| 4 | 27 April | 11:45-13:12 | 9/5 | 12,000 | 8,000 | Low altitude |

Background Characteristics

Figure 5:
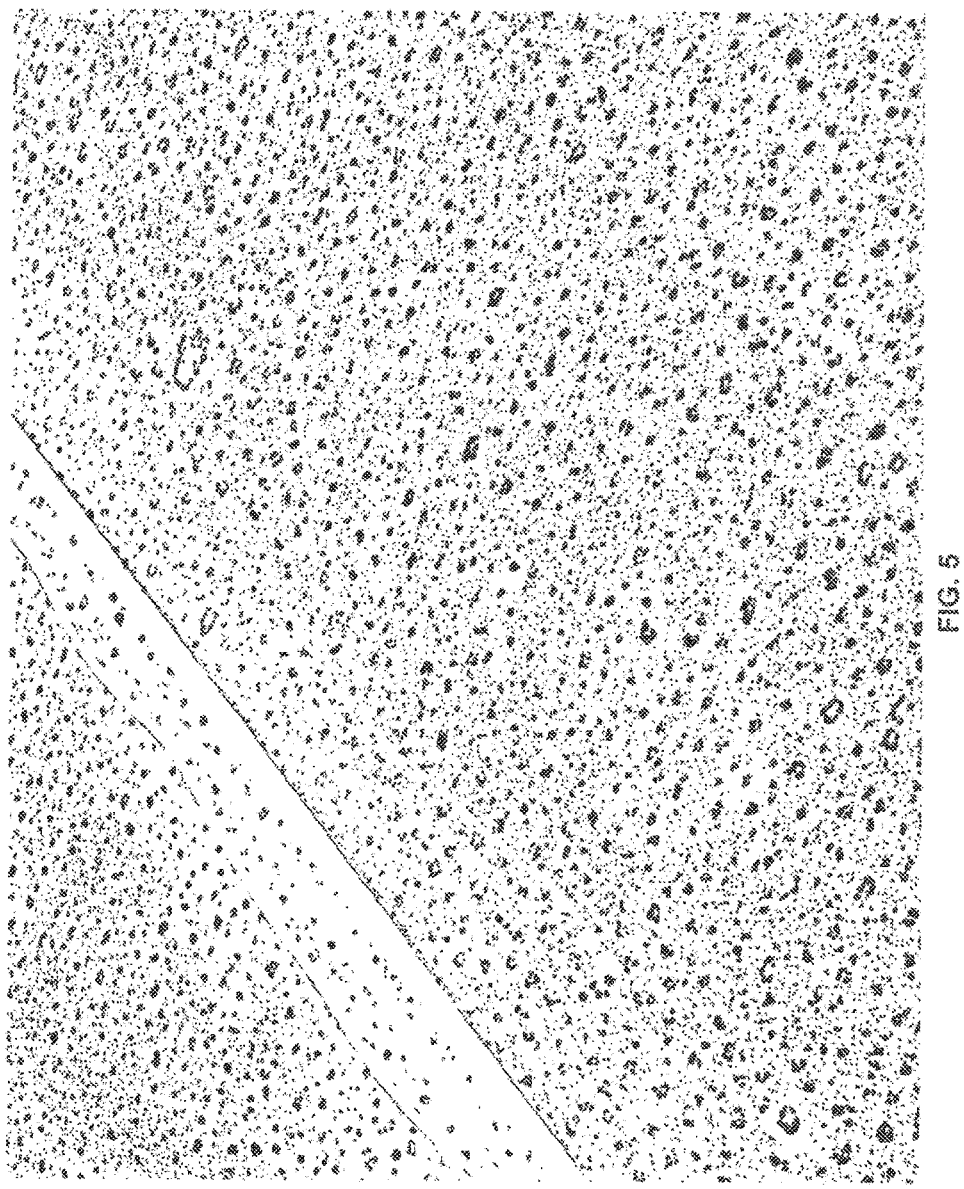
FIG. 5 shows the background characteristics used for testing.

The dominant plant that can be seen from medium to high altitude in the Mojave Desert is the creosote bush with interspersed Joshua trees. In the specific area under the low-altitude supersonic corridor, Joshua trees are very sparse and the observed vegetation is almost exclusively creosote bushes. There are three special characteristics of the creosote plant in this environment. The first is that it grows to approximately 10 ft to 12 ft in diameter (3 m to 3.7 m). Second, there is a natural mechanism that maintains separation of 5 ft to 10 ft (1.5 m to 3 m) between plants to prevent over population in water-sparse landscape (ref. 15). Third, from the air the creosote plants appear much darker than the desert floor at selected wavelengths, providing a speckle background with very good contrast. This speckled pattern is shown in FIG. 5. Taken together, these characteristics make creosote bushes the ideal background for implementing the BOS technique.

Figure 6:
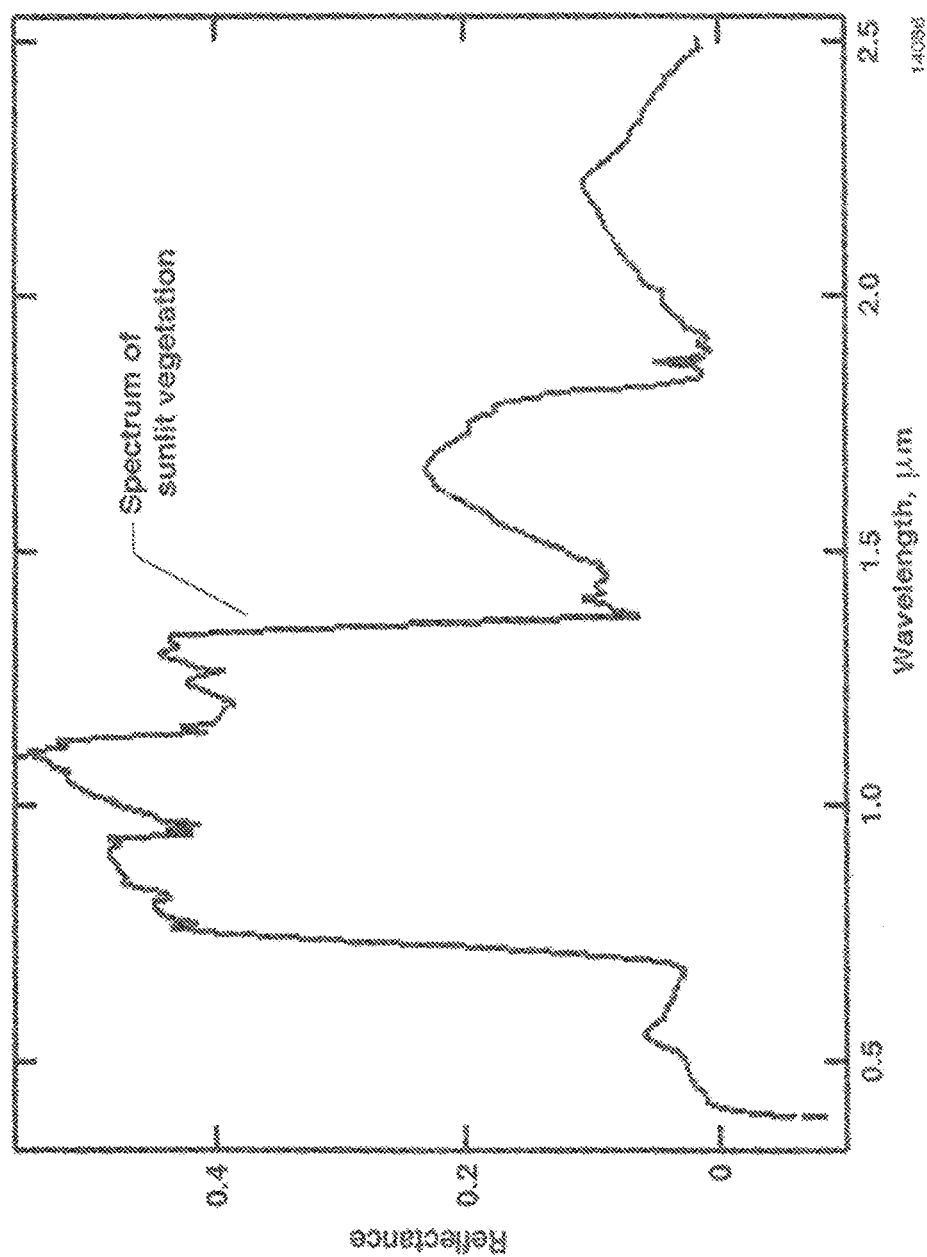
FIG. 6 is a diagram showing the reflective spectra of desert vegetation.

The spectral characteristics of desert plants are such that they reflect primarily in the far red and NIR range (See FIG. 6). FIG. 6 is from R. N. Clarke, et al., Surface reflectance calibration of terrestrial imaging spectroscopy data: a tutorial using AVIRIS. U.S. Geological Survey, www.usgs.gov, 2002. It was originally believed that to maximize contrast, a sensor that is sensitive to NIR, in addition to the visible, would be desirable. This effect has been seen by others using BOS with natural backgrounds with vegetation. It turned out, at least for the conditions tested, that the desert floor reflectivity was much higher than the vegetation, so the plant reflectivity, and consequently the NIR reflectivity, was inconsequential. This may or may not be the case at other conditions, such as time of day or time of year.

Image Processing

In another embodiment of the invention, image processing algorithms were used to determine the pixel shift of the background. Pixel shift is correlated with change of index of refraction and consequently the change in density and shockwave location.

In an additional embodiment, several steps of image processing were required to produce the Schlieren image. The initial step was determining which of the numerous passes were the most appropriate to process. On some passes the target airplane did not enter the camera view; other passes were over areas of the desert with sparse plant density.

Figure 7:
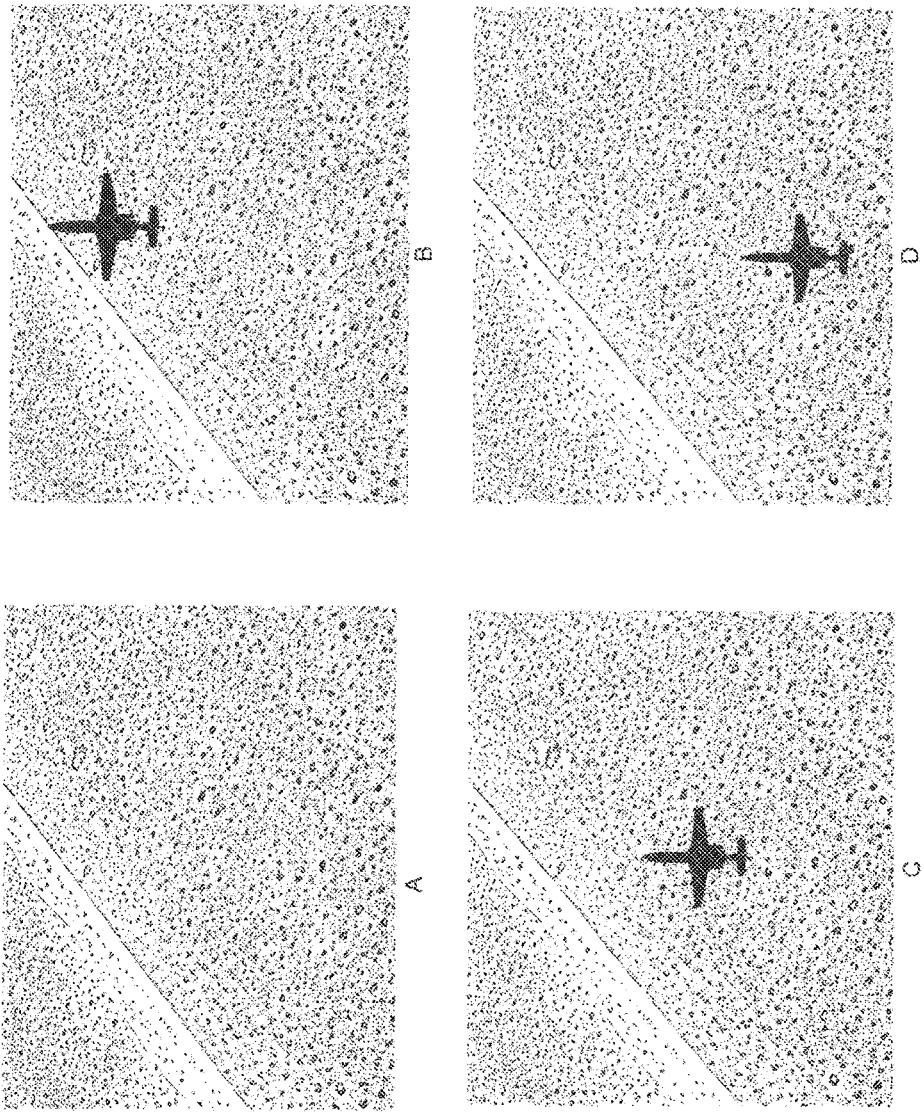
FIG. 7 shows a raw image sequence.

A sequence, such as that shown in FIG. 7, was extracted from each pass that was selected for processing. The first image of each sequence was the last "clear" frame. The stack of subsequent images was registered to the first image using software developed at the NASA Ames Research Center (Moffett Field, Calif.). Each image of the sequence of images is registered to the first image in the sequence by applying a first-order projective transformation as shown in equations (1) and (2):

$$x = \frac{a_1 x_0 + a_2 y_0 + a_3}{c_1 x_0 + c_2 y_0 + 1} \quad (1)$$

$$y = \frac{b_1 x_0 + b_2 y_0 + b_3}{c_1 x_0 + c_2 y_0 + 1} \quad (2)$$

where $(x_0, y_0)$ are pixel coordinates in the first image and $(x, y)$ are the corresponding pixel coordinates in the current image. The eight coefficients of this transformation ($a_{1-3}$, $b_{1-3}$, $c_{1-2}$) are determined by defining at least four well-separated points (for example, near the corners) in the first image and computing, by image cross correlation, the positions of these points in each subsequent image. This yields a set of 2 by n linear equations, where n is the number of points (>=4), which can be solved for the unknown coefficients. Then the transformed pixel coordinates of each point in the current image are computed from equation (1) and equation (2). This method eliminated differences in the images that were not due to disturbances created by the shockwaves of the test airplane, for example, differences due to pitch, roll, or yaw of the observer airplane.

Once the images are registered, local displacements of the background due to disturbances created by the test airplane are determined by defining an interrogation grid and computing the displacement of each node by image cross correlation. These data were processed using PIVview (Pivtec GmbH, Göttingen, Germany). The interrogation window size was determined by trial and error to be the smallest window that resulted in a signal-to-noise ratio (SNR) of the cross correlation function of at least four. An SNR of four is conservative for obtaining a resolvable peak in the correlation that was measurable. That is, with a lower SNR it was difficult to measure the subpixel shifts. The grid density was then chosen to produce 82-percent overlap between adjacent windows. The 82 percent was using the interrogation area that yielded the SNR of four, which was 12 pixels. The processing of the correlations used the multi-grid method, starting with 64-by 64-pixel windows, then refined to 16 by 16 pixels. A high-pass filter of 5 by 5 was implemented prior to the correlation pass. The peak finder was a 5 by 5 Gaussian fit, owing to the size of the plants and the high-pass filter. Finally, a conservative outlier detection was performed, which permitted interpolation from the nearest neighbors.

Figure 8:
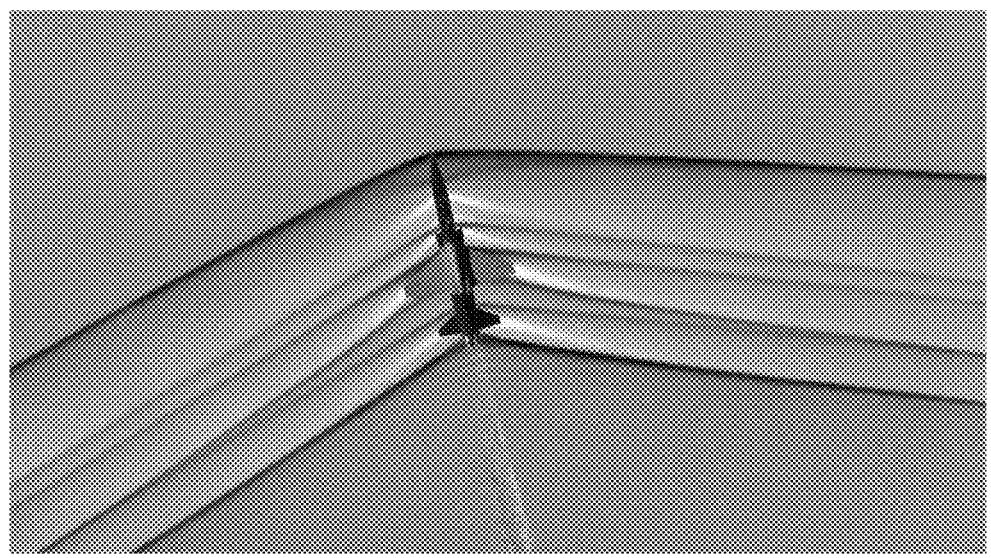
FIG. 8 shows an average sequence of AirBOS images with airplane overlay.

The data from this correlation step produce an array dataset of i, j, dx, dy, and SNR for each correlation. In this case the array data were further processed using PIVview, however, many other commercially available and self-developed plotting programs could be used. The displacements of dy were made into a grayscale contour plot and exported as bitmaps to produce the final single-instance Schlieren image. A noise band may appear at the top of the processed images due to that portion of the new frame that does not map onto the reference frame because of the forward motion of the observer airplane. As a last step, an overlay of the airplane was placed onto the image, because the airplane image was lost due to the cross-correlation process; an example is shown in FIG. 8.

Result and Discussion

The test campaign consisted of four flights with 26 total passes. Of the 26 passes, 17 passes captured the airplane or shocks in the camera field of view. The passes deemed to have the best overall characteristics were then processed.

Raw and Processed Data

The flight conditions, camera exposure, and approximate sun elevation of each of the passes presented are shown in table 3. In addition to the changes in altitudes and position of the pre-determined course line, the main parameter that was changed was the camera exposure time (or integration time). The lens was set for f/11 throughout the test. This setting was believed to be the best compromise to get a near-pinhole effect but allow enough light to get the short-duration exposures. On the first flight the exposure was set to approximately 5 ms. The first flight day was the darkest flight day due to some cloud cover. In flight 2 the exposure was reduced to 4.072 ms; flight 3 was significantly reduced to 0.5 ms; and on flight 4 the exposure was initially set at 0.25 ms and further reduced during flight to 0.2 ms. The faster exposures resulted in crisper images due to the reduction in motion-based blur. It may be necessary, however, to have brighter conditions in order to take advantage of the significantly faster exposure times. The background for flights 3 and 4 was also much more uniform than that of flight 2 and, though flight 1 backgrounds were quite good, the longer duration in exposure time blurred some of the detail in the shock structure. It appears that within the parameters tested, flight 4 was the most optimized (that is, background, time of day, overall brightness, and exposure time).

TABLE 3

Specific flight conditions of each aircraft pass presented. Flight 4 represents the best known configuration.

| Flight | Pass | King Air alt, ft MSL | F-18 alt, ft MSL | F-18 Mach | Time of day (local, PDT) | Exposure, ms | Sun elevation, deg |
|---|---|---|---|---|---|---|---|
| 1 | 1 | 13,200 | 9,900 | 1.08 | 10:09 | 5.0 | 43 |
| 2 | 4 | 13,200 | 10,060 | 1.09 | ~9:35 | 4.072 | 37 |
| 3 | 2 | 23,520 | 15,300 | 1.09 | 10:58 | 0.5 | 52 |
| 3 | 7 | 15,200 | 10,000 | 1.05 | 11:19 | 0.5 | 55 |
| 4 | 3 | 12,000 | 8,000 | 1.03 | 12:45 | 0.2 | 69 |
| 4 | 6 | 12,200 | 8,000 | 1.03 | 12:52 | 0.2 | 69 |
| 4 | 9 | 12,000 | 8,000 | 1.03 | 13:00 | 0.25 | 69 |

The closer flights (those having less vertical separation between observer and target), as expected, produced images with more spatial resolution. Even in the images from the farthest flights (those having the most vertical separation) the shockwaves persist through the end of the frame without much apparent attenuation. There is some expected spreading of the features, most notably the apparent expansion region from the wing upper surface.

Average Data

In one embodiment, image averaging is a technique used to reduce noise and consequently improve the quality of images. The averages shown herein are of the bitmap images generated using the data plotting software that produce the instantaneous images. Averaging was performed to use the same image registration utility that was used on the raw reference and data images. By cross correlating on the airplane noise "blob" (the result of the cross correlation of the airplane image), the stack of usable images were aligned and a grayscale image average was calculated pixel by pixel.

Figure 9:
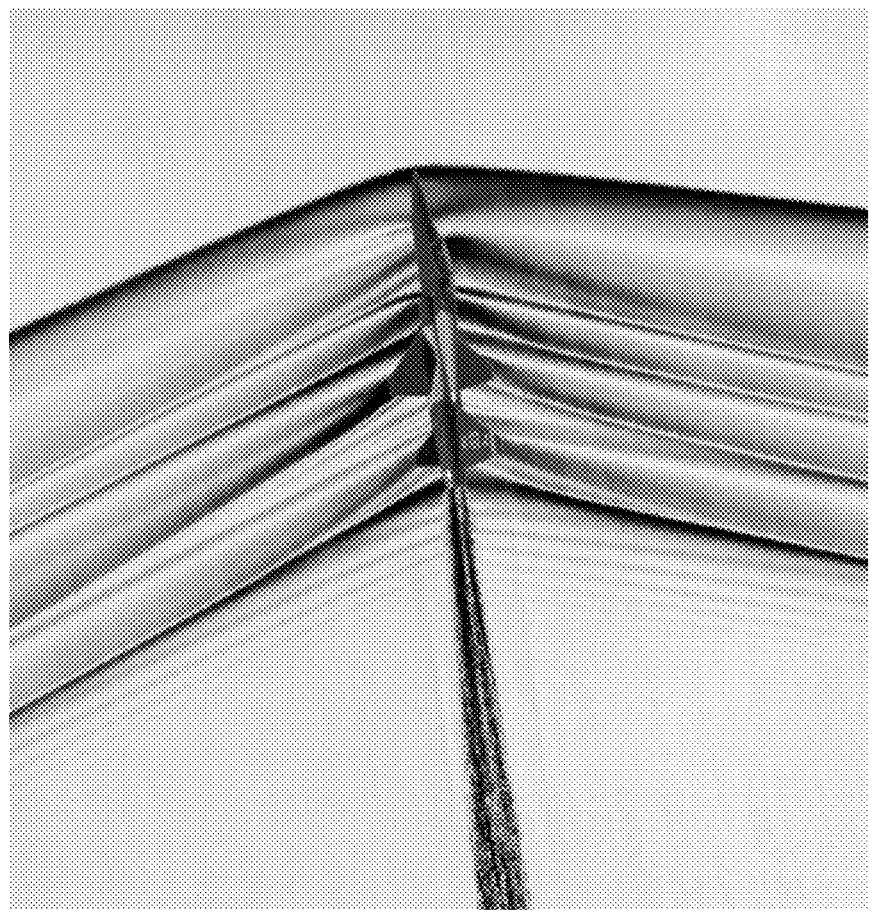
FIG. 9 shows an annotated average sequence of AirBOS images with airplane overlay.

The averaged images shown in FIGS. 8 and 9 clearly show the major shock structure generated by the airplane, including the over-wing expansion and shock around the canopy. One can see where the weaker shocks coalesce with the stronger shock in the far field. The relative ease with which results were obtained—successful results after the first flight pass—suggests that any effort to optimize this technique could pay large dividends to the test community. There seems to be no impediment to achieving the same level of quality with AirBOS as with a wind-tunnel system, because the desert floor provides an ideal speckle pattern. As well, in the years since this first series of flights, new cameras have become available that have capabilities that can produce more detailed results.

It should be understood that the foregoing relates to various embodiments of the invention and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

INDUSTRIAL APPLICATION

The invention disclosed herein pertains to an air-to-air background oriented Schlieren (AirBOS) system used for imaging the shockwaves caused by supersonic aircraft. The AirBOS system is useful in helping future engineers to design a quiet supersonic transport vehicle by being able to understand the detailed shock structure of high-speed aircraft in flight.

What is claimed is:

1. A system for visibly rendering the density changes in air caused by an airborne vehicle, the system comprising:
    a natural background with consistent contrast and sunlight reflectivity;
    a sensor aircraft moving at slow airspeed and at level altitude;
    a target aircraft moving at a level altitude between the sensor aircraft and the natural background and in-line and beneath the sensor aircraft;
    a visible spectrum camera and a data capture device residing on the sensor aircraft for capturing a reference image that does not include the target aircraft, and for capturing a series of data images of the target aircraft and associated refractive air distortion in the air through which the target aircraft passes beneath the sensor aircraft; and
    a processor to correlate the series of data images of the target aircraft and associated air distortion, and to subtract the reference image from the data images of the target aircraft and associated air distortion, and to compute the average of the data images showing the visible density changes in the air.

2. The system of claim 1 wherein the visible spectrum camera has a spectral range of no longer than 0.9 micrometers, resolution of at least 640 by 512 pixels, no longer than 25 micrometer pixel pitch, and a frame rate of at least 100 frames per second.

3. The system of claim 1 wherein the processor registers the data images to the reference image to minimize the displacement between the reference and data images due to movement of the sensor aircraft.

4. The system of claim 1 wherein the density changes include at least one of shockwaves, vortices, engine exhaust, wakes, and air disturbances.

5. The system of claim 1 wherein the distance ratio between the visible spectrum camera and the natural background is limited only to the hyperfocal distance of the observing lens.

6. A method for visibly rendering the density changes in air caused by an airborne vehicle, the method comprising the steps:
    flying a sensor aircraft at slow airspeed and at level altitude over a natural background having consistent contrast and sunlight reflectivity;
    flying a target aircraft at level altitude where the altitude of the target aircraft is between the sensor aircraft and the natural background and the path of the target aircraft is in-line with the sensor aircraft;
    capturing a series of visual spectrum images that include at least one reference image before the target aircraft enters the image frame and two or more data images where the target aircraft is passing through the image frame; and
    correlating the series of data images and mathematically comparing the reference image to compute an average of the data images showing the visible density changes in the air.

7. The method of claim 6 wherein the density changes include at least one of shockwaves, vortices, engine exhaust, wakes, and air disturbances.

8. The method of claim 6 wherein the data images are registered to the reference image to minimize the displacement between the reference and data images due to movement of the sensor aircraft.

9. The method of claim 8 further including movement tracking of the airborne target aircraft.

10. The method of claim 9 further including measurement of the displacement of the background between the reference and data images at each node in the interrogation grid by image cross correlation and optical flow procedures.

* * * * *